(12) United States Patent
Dargue

(10) Patent No.: US 11,468,779 B2
(45) Date of Patent: *Oct. 11, 2022

(54) SYSTEM AND METHOD OF DEVELOPING AND MANAGING A TRAINING PROGRAM

(71) Applicant: The Boeing Company, Chicago, IL (US)

(72) Inventor: Brandt Wilson Dargue, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,576

(22) Filed: Dec. 1, 2020

(65) Prior Publication Data

US 2021/0104170 A1 Apr. 8, 2021

Related U.S. Application Data

(63) Continuation of application No. 15/060,169, filed on Mar. 3, 2016, now Pat. No. 10,902,736.

(51) Int. Cl.
*G09B 7/00* (2006.01)

(52) U.S. Cl.
CPC .................... *G09B 7/00* (2013.01)

(58) Field of Classification Search
CPC ... G09B 7/00; G09B 7/04; G09B 7/08; G09B 7/12; G09B 9/08; G09B 9/16; G09B 9/30
USPC ........ 434/29, 30, 33, 34, 35, 36, 38, 41, 44, 434/45, 47, 49, 335, 336
See application file for complete search history.

(56) References Cited

U.S. PATENT DOCUMENTS

| 5,306,154 A | 4/1994 | Ujita et al. |
| 5,597,312 A | 1/1997 | Bloom et al. |
| 5,779,486 A | 7/1998 | Ho et al. |
| 5,904,485 A | 5/1999 | Siefert |

(Continued)

OTHER PUBLICATIONS

Butt, Thomas; "Adaptive Practice High-Efficiency Game-Based Learning;" Jan. 17, 2013; available at http://www.brainrush.com/pdf/AdaptivePracticeWhitepaper_pdf; last visited Jan. 22, 2016.

(Continued)

*Primary Examiner* — Joseph B Baldori
(74) *Attorney, Agent, or Firm* — Armstrong Teasdale LLP

(57) ABSTRACT

A method of developing and managing a training program that includes displaying a parameter selection window, receiving a selection of values of parameters to define a first training program, wherein the values of the parameters are rated on a first challenge level scale, determining a predicted performance level of a learner taking the first training program, the predicted performance level determined based on actual performance data of the learner and rated on a second challenge level scale, comparing the predicted performance level to a desired outcome, displaying results of the comparison if a difference between the predicted performance level and the desired outcome is greater than a threshold, receiving an adjustment to the values of the parameters to define a second training program, wherein the second training program has a different challenge level relative to the first training program, and administering the second training program to the learner.

20 Claims, 2 Drawing Sheets

(56) References Cited

U.S. PATENT DOCUMENTS

| | | | |
|---|---|---|---|
| 5,911,581 | A | 6/1999 | Reynolds et al. |
| 6,341,267 | B1 | 1/2002 | Taub |
| 6,435,878 | B1 | 8/2002 | Reynolds et al. |
| 6,652,283 | B1 | 11/2003 | Van Schaack et al. |
| 8,021,160 | B2 | 9/2011 | Chang |
| 8,500,450 | B1 | 8/2013 | Taylor et al. |
| 8,568,145 | B2 * | 10/2013 | Jastrzembski ......... G06Q 10/10 434/428 |
| 9,275,332 | B2 | 3/2016 | Lu et al. |
| 9,542,853 | B1 | 1/2017 | Bergeron |
| 9,818,306 | B2 | 11/2017 | Fang et al. |
| 9,984,586 | B2 | 5/2018 | Popa-Simil et al. |
| 2002/0107681 | A1 | 8/2002 | Goodkovsky |
| 2009/0035733 | A1 | 2/2009 | Meitar et al. |
| 2011/0229864 | A1 | 9/2011 | Short et al. |
| 2014/0248588 | A1 | 9/2014 | Williams et al. |
| 2015/0050623 | A1 | 2/2015 | Falash et al. |
| 2015/0206440 | A1 | 7/2015 | Aylesworth et al. |
| 2016/0049086 | A1 | 2/2016 | Mayr |
| 2017/0287356 | A1 | 10/2017 | Stephen et al. |
| 2018/0357915 | A1 | 12/2018 | Harlow et al. |

OTHER PUBLICATIONS

Shernoff, David J. et al.; "Student Engagement in High School Classrooms from the Perspective of Flow Theory;" School Psychology Quarterly; vol. 18 No. 2; 2003; pp. 158-176.

Shernoff, David J. et al; "Further Evidence of an Engagement-Achievement Paradox Among U.S. High School Students;" Journal of Youth Adolescence; 2008; vol. 37; pp. 564-580.

Bayesian Network. Wikipedia: The Free Encyclopedia. Wikimedia Foundation, Inc.; page last modified Jan. 20, 2016; available at https://en.wikipedia_org/wiki/Bayesian_network; last visited Jan. 22, 2016.

Yudkowsky, Eliezer S.; "An Intuitive Explanation of Bayes' Theorem;" 2003; page last modified Jun. 4, 2006; available at http://www.yudkowsky.net/rational/bayes; last visited Jan. 22, 2016.

Shernoff, David et al.; "The Quality of Classroom Experiences;" M. Csikszentmihalyi & B. Schneider (Eds.); Becoming Adult: How Teenagers Prepare for the Word of Work; New York; Basic Books; 2000; pp. 141-164.

Whalen, Samuel P. et al.; Putting Flow Theory into Educational Practice: The Key School's Flow Activities Room; Report to the Benton Center for Curriculum and Instruction; University of Chicago; May 1991; 67 pp.

Bhernoff, David et al.; "Continuing Motivation Beyond the High School Classroom;" New Directions for Child and Adolescent Development; Jossey-Bass; Fall 2001; pp. 73-87.

Shernoff, David J et al.; "Flow and Optimal Learning Environments;" J. Froh & A. Parks (Eds); Activities for Teaching Positive Psychology, A Guide for Instructors; Washington, D.C.; American Psychological Association; 2013; DP-109-115.

* cited by examiner

SYSTEM AND METHOD OF DEVELOPING AND MANAGING A TRAINING PROGRAM

CROSS-REFERENCE TO RELATED APPLICATION

This application is a continuation application and claims priority to U.S. patent application Ser. No. 15/060,169, filed Mar. 3, 2016, and issued as U.S. Pat. No. 10,902,736, on Jan. 26, 2021, entitled "SYSTEM AND METHOD OF DEVELOPING AND MANAGING A TRAINING PROGRAM," which is incorporated by reference in its entirety.

BACKGROUND

The field of the present disclosure relates generally to adaptive learning techniques and, more specifically, to a learning effectiveness adjustment and optimization methodology that properly challenges learners based on the principles of predictive analytics and probabilities.

Training and education is typically conducted in the same way for all learners, which results in dissatisfaction and demotivation for both high-performing learners and low-performing learners. For example, when the same training and education technique is utilized for all learners in a group of learners, high-performing learners are demotivated as a result of not being properly challenged, and low-performing learners are demotivated as a result of a mental condition known as "learned helplessness."

At least some known training and education techniques are adaptable by either manually adjusting the parameters of an examination or simulation, or by automatically adjusting the parameters based on the past performance of an individual learner. However, manual adjustments are influenced by inherent cognitive biases that effect a person's interpretation of information and probabilities. For example, students conducting self-study may have a tendency to over-study and focus on topics that have already been mastered. Moreover, automatic adjustments typically only modify a lesson at a high level by forcing a learner to re-attempt a particular lesson or by providing the option to skip additional lessons on topics that have already been mastered.

BRIEF DESCRIPTION

In one aspect, a method of developing and managing a training program is provided. The method includes displaying, on a user interface, a parameter selection window, receiving, from a first user input at the parameter selection window, a selection of values of parameters that define the training program, which is to be taken by at least one learner, thereby defining a first training program, wherein the values of the parameters are rated on a first challenge level scale, determining, with a computing device in communication with the user interface, a predicted performance level of the at least one learner taking the first training program, the predicted performance level determined based on actual performance data generated as a result of the at least one learner previously taking at least one training program defined by the parameters, and the predicted performance level rated on a second challenge level scale, comparing, with the computing device, the predicted performance level to a desired outcome on the second challenge level scale, displaying results of the comparison on the user interface if a difference between the predicted performance level and the desired outcome is greater than a threshold, receiving, from a second user input at the parameter selection window, an adjustment to the values of the parameters to define a second training program, wherein the second training program has an increased or a decreased challenge level relative to the first training program on the second challenge level scale, and administering the second training program to the at least one learner.

In another aspect, a system for use in developing and managing a training program is provided. The system includes a user interface configured to display a parameter selection window; and a computing device coupled in communication with said user interface, said computing device configured to receive, from a first user input at the parameter selection window, a selection of values of parameters that define the training program, which is to be taken by at least one learner, thereby defining a first training program, wherein the values of the parameters are rated on a first challenge level scale, determine a predicted performance level of the at least one learner taking the first training program, the predicted performance level determined based on actual performance data generated as a result of the at least one learner previously taking at least one training program defined by the parameters, and the predicted performance level rated on a second challenge level scale, compare the predicted performance level to a desired outcome on the second challenge level scale, display results of the comparison on said user interface if a difference between the predicted performance level and the desired outcome is greater than a threshold, receive, from a second user input at said user interface, an adjustment to the values of the parameters to define a second training program, wherein the second training program has an increased or a decreased challenge level relative to the first training program on the second challenge level scale, and provide the second training program for administration to the at least one learner.

In yet another aspect, a computer-readable storage media having computer-executable instructions embodied thereon for use in developing and managing a training program is provided. When executed by at least one processor, the computer-executable instructions cause the processor to display, on a user interface, a parameter selection window, receive, from a first user input at the parameter selection window, a selection of values of parameters that define the training program, which is to be taken by at least one learner, thereby defining a first training program, wherein the values of the parameters are rated on a first challenge level scale, determine a predicted performance level of the at least one learner taking the first training program, the predicted performance level determined based on actual performance data generated as a result of the at least one learner previously taking at least one training program defined by the parameters, and the predicted performance level rated on a second challenge level scale, compare the predicted performance level to a desired outcome on the second challenge level scale, display results of the comparison on the user interface if a difference between the predicted performance level and the desired outcome is greater than a threshold, receive, from a second user input at the parameter selection window, an adjustment to the values of the parameters to define a second training program, wherein the second training program has an increased or a decreased challenge level relative to the first training program on the second challenge level scale, and provide the second training program for administration to the at least one learner.

DETAILED DESCRIPTION

Figure 1:
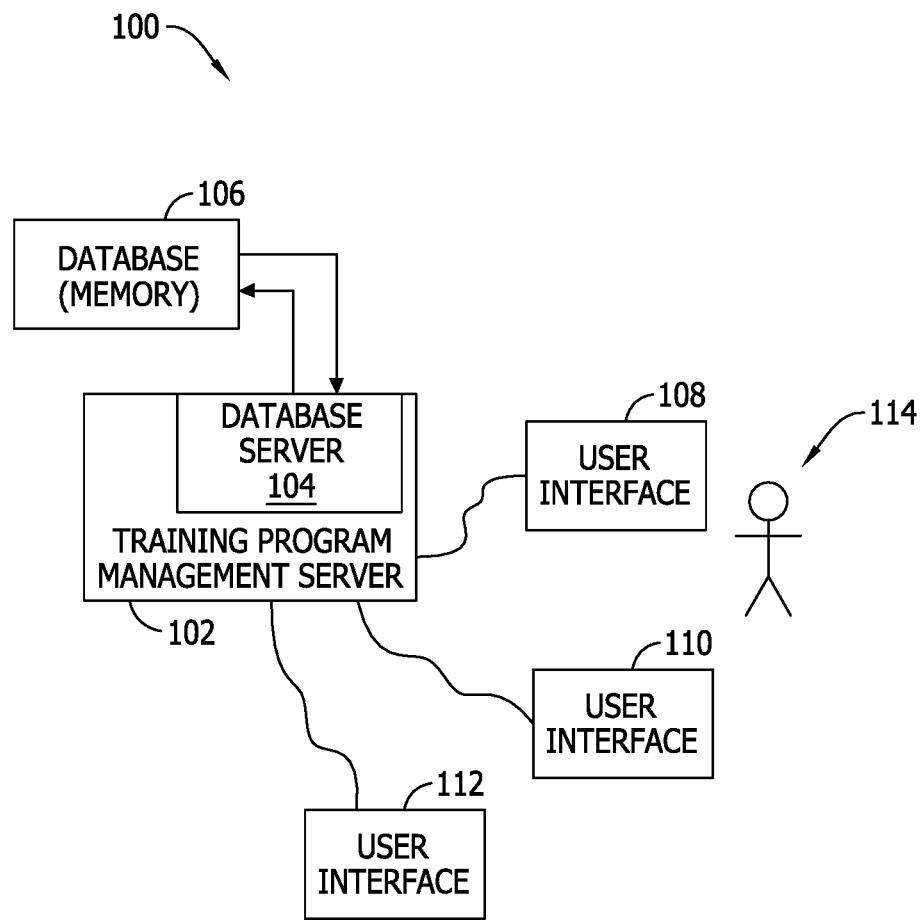
FIG. 1 is a schematic illustration of an exemplary system for use in developing a training program.

The implementations described herein relate to systems and methods that provide a customizable reporting and optimization tool to facilitate developing, planning, and managing a training program to enhance the learning effect for an individual learner or a group of learners. More specifically, the systems and methods described herein enable parameters of the training program to be displayed and individually adjusted such that an instructor is able to view the predicted learning effect of adjusting the parameters. The predicted learning effect is based on actual performance data for the learner, and the parameters of the training program are adjusted to ensure the learner is properly motivated. For example, the parameters are adjusted such that the learner is neither overwhelmed nor underwhelmed by the training program to facilitate reducing apathy and anxiety in the learner. As such, the learner is properly motivated, and an efficient and effective learning environment is provided.

Described herein are computer systems that facilitate adjusting a training program. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example purposes only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one implementation, a computer program is provided, and the program is embodied on a computer readable medium. In an example implementation, the system is executed on a single computer system, without requiring a connection to a sever computer. In a further implementation, the system is being run in a Windows® environment (Windows is a registered trademark of Microsoft Corporation, Redmond, Wash.). In yet another implementation, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some implementations, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Referring to the drawings, FIG. 1 is a schematic illustration of an exemplary system 100 for use in developing a training program. In the exemplary implementation, system 100 is used to define a training program from a plurality of parameters, define a desired outcome of the training program for at least one learner, determine a predicted outcome for the training program for the at least one learner, and receive, via a user interface, an adjustment of the plurality of parameters if a difference between the desired outcome and the predicted outcome is greater than a predetermined threshold. System 100 includes a training program management server 102, a database server 104 within training program management server 102, and a database 106 coupled in communication with database server 104. Training program management server 102 is a computing device that facilitates managing development and administration of the training program, as will be described in more detail below.

As used herein, "training program" refers to any singular training event, an aggregation of training events, or a portion of a training event. As such, system 100 may be used to develop, plan, and manage a portion of a simulation event, a complete simulation event, or a series of events (e.g., a class or course).

In the exemplary implementation, system 100 also includes a plurality of user interfaces, such as a first user interface 108, a second user interface 110, and a third user interface 112. The plurality of user interfaces are computers that include a web browser or a software application, which enables first user interface 108, second user interface 110, and third user interface 112 to access training program management server 102 using the Internet, a local area network (LAN), or a wide area network (WAN). More specifically, the plurality of user interfaces are communicatively coupled to the Internet through one or more interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The plurality of user interfaces can be any device capable of accessing the Internet including, but not limited to, a desktop computer, a laptop computer, a personal digital assistant (PDA), a cellular phone, a smartphone, a tablet, a phablet, or other web-based connectable equipment. In some implementations, one or more of the user interfaces are either a dedicated instructor interface or a dedicated learner interface. Alternatively, system 100 includes a single user interface that acts as both an instructor interface and a learner interface.

Database server 104 is coupled in communication with database 106 that stores data. Database 106 stores data thereon, such as parameters for defining the training program. For example, database 106 stores parameters of a flight simulation and/or parameters of an examination thereon. The parameters of the flight simulation include, but are not limited to, at least one of weather conditions, technological malfunctions, types of aircraft, and third party interference. The parameters of the examination include, but are not limited to, at least one of a duration of the examination, types of questions on the examination, and a number of each type of question on the examination. Moreover, database 106 stores actual performance data for at least one learner thereon. The actual performance data includes recent performance data and older performance data for the at least one learner. In an alternative implementation, database 106 also stores empirical performance data thereon. Empirical performance is generally defined by the effect of well-known variables or criteria on performance data for a theoretical learner. For example, it may be well-known that it is more difficult to land an aircraft in windy conditions, as opposed to calm conditions.

In the exemplary implementation, database 106 is stored remotely from training program management server 102. Alternatively, database 106 is decentralized. Moreover, as will be described in more detail below, a user can access training program management server 102 or database 106 via one or more of first, second, and third user interfaces 108, 110, and 112. Training program management server 102 is coupled in communication with the first, second, and third user interfaces 108, 110, and 112. In some implementations, training program management server 102 is decentralized and includes of a plurality of computer devices which work together as described herein.

In operation, an instructor 114 interacts with first user interface 108 to access a training program development/management tool on training program management server 102. As described above, training program management server 102 is a computing device that facilitates managing development and administration of the training program. More specifically, training program management server 102 defines the training program from a plurality of parameters and defines a desired outcome of the training program for at least one learner. The parameters of the training program and the desired outcome may be selected at first user interface 108 by instructor 114 to dynamically tailor and/or enhance the learning effectiveness of the training program. Training program management server 102 further determines a predicted outcome for the training program for the at least one learner. The predicted outcome is determined based on actual performance data for the plurality of parameters for the at least one learner.

As described above, the learning effectiveness of a training program is based at least partially on a level of difficulty of the training program such that the learner is neither overwhelmed nor underwhelmed. As such, in the exemplary implementation, training program management server 102 defines the desired outcome having a quantifiable achievement level of less than 100 percent. Put another way, the desired outcome is selected such that the at least one learner fails to achieve a perfect score, and thus, feels properly challenged. Additionally, the desired outcome is selected such that the at least one learner is not overly challenged and demotivated. As such, in one implementation, training program management server 102 defines the desired outcome having the quantifiable achievement level defined within a range between about 60 percent and about 80 percent, depending on other motivating factors.

In some implementations, training program management server 102 displays the predicted outcome for the training program for the at least one learner on first user interface 108. Instructor 114 is then able to determine if the parameters of the training program will properly challenge the at least one learner once the training program is administered. For example, system 100 provides informs instructor 114 of an imbalance between the desired outcome and the predicted outcome and, if a difference between the desired outcome and the predicted outcome is greater than a predetermined threshold, system 100 enables instructor 114 to adjust the parameters of the training program. More specifically, training program management server 102 receives, via first user interface 108, an adjustment of the plurality of parameters if the difference between the desired outcome and the predicted outcome is greater than the predetermined threshold. Similar to the selection of the desired outcome, the adjustment to the plurality of parameters is such that the predicted outcome has a quantifiable achievement level of less than 100 percent. As such, receiving the adjustment of the plurality of parameters ensures an effective learning environment is provided to the at least one learner.

Moreover, as described above, actual performance data for the at least one learner is stored on database 106. In the exemplary implementation, the actual performance data includes recent performance data and older performance data for the least one learner. As such, in one implementation, training program management server 102 accesses the actual performance data that includes recent performance data and older performance data for the at least one learner, and determines the predicted outcome for the training program for the at least one learner based on a weighted average of the actual performance data. The weighted average has a greater emphasis on the recent performance data than the older performance data. As such, the predicted outcome calculated by training program management server 102 is more accurately determined.

Once the training program has been developed and the predicted outcome substantially coincides with the desired outcome, the training program is then administered to the at least one learner on second user interface 110 and third user interface 112. Moreover, coupling first, second, and third user interfaces 108, 110, and 112 in communication with each other via training program management server 102 enables instructor 114 to tailor the training program administered to a group of learners quickly based on the actual performance data for each learner.

Mathematics Examination

In the example articulated below, an instructor uses the systems and methods described herein to develop a learning activity for a group of learners. More specifically, the learning activity is a mathematics examination that includes a set of addition problems and a set of subtraction problems to be solved in a certain time period. The parameters of the mathematics examination are the number of addition problems, the number of subtraction problems, and the duration for completing the examination.

Referring to Table 1, actual performance data for a group of learners is displayed. Learner A is very good at addition (95%), but is not as good at subtraction (70% at the same pace). Learner B is not good at addition (40%-80% depending on duration), but is very good at subtraction (90%+). Learner C is good at both addition and subtraction (90%), but needs more time than both Learner A and Learner B to achieve a high performance level (60%).

TABLE 1

Actual Performance Data

| Learner | Average Addition Score and Answer Rate | Average Subtraction Score and Answer Rate |
|---|---|---|
| A | 95% @ 2 questions/min | 70% @ 2 questions/min |
|   |                       | 90% @ 1 question/min |
| B | 40% @ 2 questions/min | 90% @ 2 questions/min |
|   | 75% @ 1 question/min  | 95% @ 1 question/min |
|   | 80% @ 0.5 questions/min |                      |
| C | 60% @ 2 questions/min | 60% @ 2 questions/min |
|   | 90% @ 1 question/min  | 90% @ 1 question/min |

TABLE 2

Report of Predicted Outcomes

| | Parameters | | | |
|---|---|---|---|---|
| Learner | 10 Addition 10 Subtraction 10 Minutes | 10 Addition 10 Subtraction 20 Minutes | 8 Addition 12 Subtraction 10 Minutes | 15 Addition 5 Subtraction 10 Minutes |
| A | $(.95*10 + .70*10)/20 = 0.83$ | $(.95*10 + .90*10)/20 = 0.93$ | $(.95*8 + .70*12)/20 = 0.80$ | $(.95*15 + .70*5)/20 = 0.89$ |
| B | $(.40*10 + .90*10)/20 = 0.65$ | $(.75*10 + .95*10)/20 = 0.85$ | $(.40*8 + .90*12)/20 = 0.70$ | $(.40*15 + .90*5)/20 = 0.53$ |
| C | $(.60*10 + .60*10)/20 = 0.60$ | $(.90*10 + .90*10)/20 = 0.90$ | $(.60*8 + .60*12)/20 = 0.60$ | $(.60*15 + .60*5)/20 = 0.60$ |

As shown in Table 2, the parameters of the examination were adjusted and the predicted outcome for each Learner was determined. As described above, the predicted outcome for each Learner should have a quantifiable achievement level of less than 100 percent to facilitate reducing apathy in the Learners. More specifically, the best learning typically occurs when the predicted outcome for a training program has a quantifiable achievement level defined within a range between about 60 percent and about 80 percent. As such, in the above example, the examination that included 8 addition problems, 12 subtraction problems, and a duration of 10 minutes had a combination of parameters that would result in the most effective learning experience for Learners A, B, and C. In an alternative implementation, parameters of the examination can be individually tailored for each Learner such that Learners A, B, and C each take a different examination.

Flight Simulation

Figure 2:
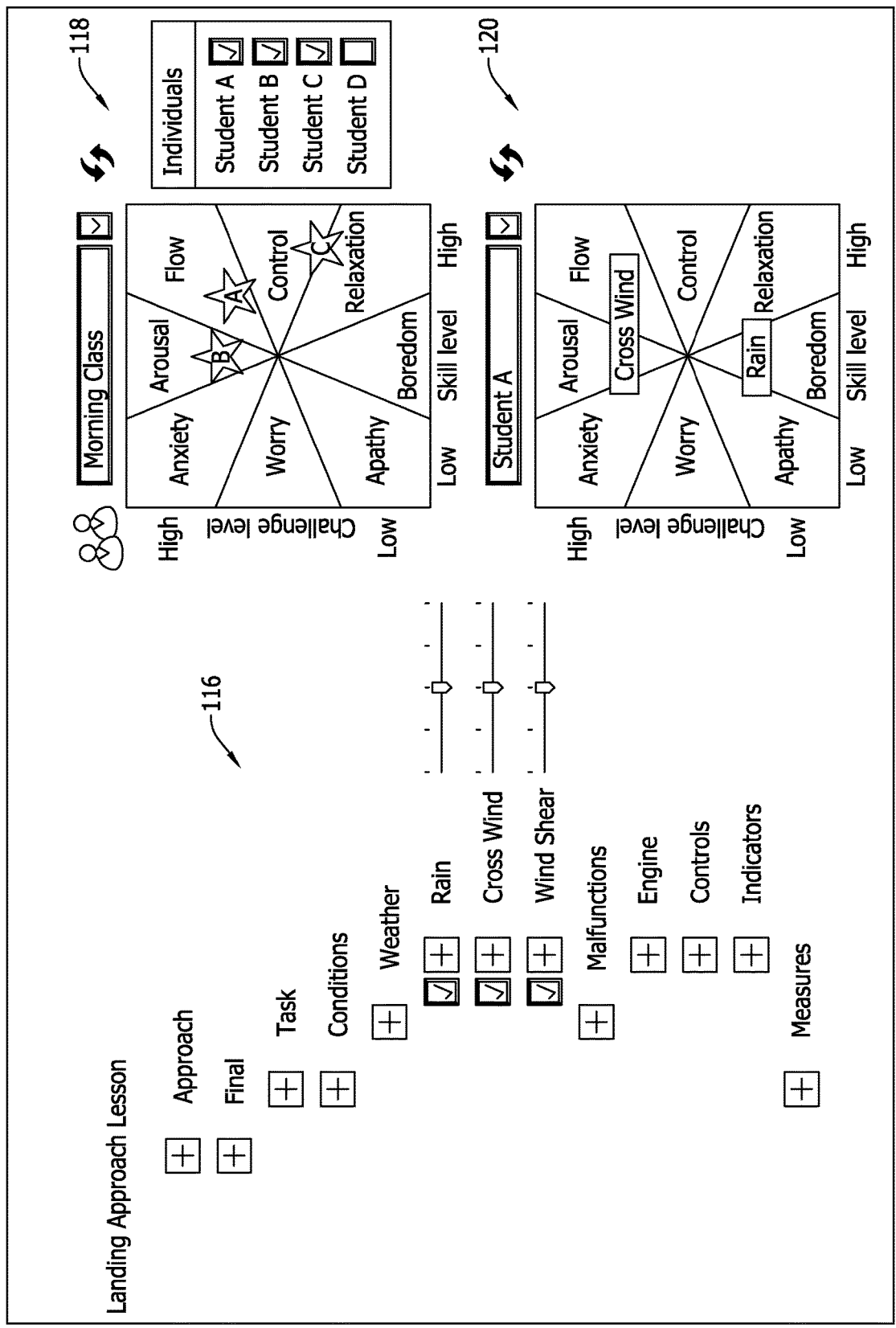
FIG. 2 is an exemplary user interface that may be used to assess the learning effectiveness of a flight simulation program.

Referring to FIG. 2, results and performance data are displayed for a flight simulation training program that includes a landing approach lesson. Displayed on user interface 108 are a parameter selection window 116, a class performance window 118, and an individual performance window 120. Parameter selection window 116 enables an instructor to adjust the parameters of the flight simulation training program, such as weather conditions including rain, cross-wind, and wind shear, and technological malfunctions including engine malfunctions, control malfunctions, and indicator malfunctions. Class performance window 118 displays each student's predicted performance level when different parameters are selected for the flight simulation program. The predicted performance level for the students is rated on a challenge level scale and a skill level scale, each from low to high. A student whose predicted performance level falls within the "Apathy" portion of the scale and at low levels of both the challenge level scale and the skill level scale may generally be classified as having a quantifiable achievement level of about 100 percent. As such, the parameters of the flight simulation training program may need to be adjusted to ensure a student is properly challenged.

In the exemplary implementation, moderate levels of rain and cross-wind are selected for the flight simulation training program. The predicted performance levels are determined based on performance data for each student for a flight simulation having similar parameters. In the exemplary implementation, Student A would be "in the flow", Student B would be "aroused", and Student C would be on the relaxed side of feeling "in control".

Individual performance window 120 displays a student's predicted performance level in response to each selected parameter for the flight simulation training program. In the exemplary implementation, it is shown that Student A finds "rain" to be boring and at the low end of the challenge level scale, but "cross-wind" is at the correct challenge level. As such, the instructor is provided with a tool that enables him/her to view and dynamically adjust the parameters of a flight simulation training program to ensure the challenge level and skill level is properly determined for each student.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of developing and managing a training program, said method comprising:
    displaying, on a user interface, a parameter selection window;
    receiving, from a first user input at the parameter selection window, a selection of values of parameters that define the training program, which is to be taken by at least one learner, thereby defining a first training program, wherein the values of the parameters are rated on a first challenge level scale;
    determining, with a computing device in communication with the user interface, a predicted performance level of the at least one learner taking the first training program, the predicted performance level determined based on actual performance data generated as a result of the at least one learner previously taking at least one training program defined by the parameters, and the predicted performance level rated on a second challenge level scale;
    comparing, with the computing device, the predicted performance level to a desired outcome on the second challenge level scale;
    displaying results of the comparison on the user interface if a difference between the predicted performance level and the desired outcome is greater than a threshold;
    receiving, from a second user input at the parameter selection window, an adjustment to the values of the parameters to define a second training program, wherein the second training program has an increased or a decreased challenge level relative to the first training program on the second challenge level scale; and
    administering the second training program to the at least one learner.

2. The method in accordance with claim 1, wherein receiving an adjustment comprises adjusting the value of parameters to define the second training program having a quantifiable achievement level of less than 100 percent.

3. The method in accordance with claim 2, wherein receiving an adjustment comprises adjusting the value of parameters to define the second training program having the quantifiable achievement level defined within a range between 60 percent and 80 percent.

4. The method in accordance with claim 1, wherein the actual performance data comprises recent performance data and older performance data for the at least one learner, wherein determining a predicted performance level comprises determining the predicted performance level based on a weighted average of the actual performance data, the weighted average having a greater emphasis on the recent performance data than the older performance data.

5. The method in accordance with claim 1 further comprising:
    determining a predicted performance level for a plurality of learners taking the training program; and
    adjusting the values of the parameters for the first training program such that the predicted performance level for each learner of the plurality of learners falls within a quantifiable achievement level threshold.

6. The method in accordance with claim 1, wherein the displaying comprises displaying the parameter selection window on a first user interface, and wherein the administering comprises administering the second training program to the at least one learner on a second user interface.

7. The method in accordance with claim 1, wherein the training program is a flight simulation, wherein determining a predicted performance level comprises determining the predicted performance level based on a selection of technological malfunction parameters including engine malfunctions, control malfunctions, and indicator malfunctions, and based on a selection of weather conditions.

8. A system for use in developing and managing a training program, said system comprising:
    a user interface configured to display a parameter selection window; and
    a computing device coupled in communication with said user interface, said computing device configured to:
        receive, from a first user input at the parameter selection window, a selection of values of parameters that define the training program, which is to be taken by at least one learner, thereby defining a first training program, wherein the values of the parameters are rated on a first challenge level scale;
        determine a predicted performance level of the at least one learner taking the first training program, the predicted performance level determined based on actual performance data generated as a result of the at least one learner previously taking at least one training program defined by the parameters, and the predicted performance level rated on a second challenge level scale;
        compare the predicted performance level to a desired outcome on the second challenge level scale;
        display results of the comparison on said user interface if a difference between the predicted performance level and the desired outcome is greater than a threshold;
        receive, from a second user input at said user interface, an adjustment to the values of the parameters to define a second training program, wherein the second training program has an increased or a decreased challenge level relative to the first training program on the second challenge level scale; and
        provide the second training program for administration to the at least one learner.

9. The system in accordance with claim 8, wherein said computing device is further configured to receive the adjustment to define the second training program having a quantifiable achievement level of less than 100 percent.

10. The system in accordance with claim 9, wherein said computing device is further configured to receive the adjustment to define the second training program having the quantifiable achievement level within a range between 60 percent and 80 percent.

11. The system in accordance with claim 8, wherein said computing device is further configured to:
    access actual performance data that includes recent performance data and older performance data for the at least one learner; and
    determine the predicted performance level for the first training program for the at least one learner based on a weighted average of the actual performance data, the weighted average having a greater emphasis on the recent performance data than the older performance data.

12. The system in accordance with claim 8, wherein said user interface comprises a first user interface and a second user interface, said computing device further configured to display the parameter selection window on said first user interface, and to provide the second training program to the at least one learner on a second user interface.

13. The system in accordance with claim 8, wherein the training program is a flight simulation, wherein said computing device is further configured to determine the predicted performance level based on a selection of technological malfunction parameters including engine malfunctions, control malfunctions, and indicator malfunctions, and based on a selection of weather conditions.

14. A computer-readable storage media having computer-executable instructions embodied thereon for use in developing and managing a training program, wherein, when executed by at least one processor, the computer-executable instructions cause the processor to:

display, on a user interface, a parameter selection window;

receive, from a first user input at the parameter selection window, a selection of values of parameters that define the training program, which is to be taken by at least one learner, thereby defining a first training program, wherein the values of the parameters are rated on a first challenge level scale;

determine a predicted performance level of the at least one learner taking the first training program, the predicted performance level determined based on actual performance data generated as a result of the at least one learner previously taking at least one training program defined by the parameters, and the predicted performance level rated on a second challenge level scale;

compare the predicted performance level to a desired outcome on the second challenge level scale;

display results of the comparison on the user interface if a difference between the predicted performance level and the desired outcome is greater than a threshold;

receive, from a second user input at the parameter selection window, an adjustment to the values of the parameters to define a second training program, wherein the second training program has an increased or a decreased challenge level relative to the first training program on the second challenge level scale; and provide the second training program for administration to the at least one learner.

15. The computer-readable storage media in accordance with claim 14, wherein the computer-executable instructions further cause the processor to receive the adjustment to define the second training program having a quantifiable achievement level of less than 100 percent.

16. The computer-readable storage media in accordance with claim 15, wherein the computer-executable instructions further cause the processor to receive the adjustment to define the second training program having the quantifiable achievement level within a range between 60 percent and 80 percent.

17. The computer-readable storage media in accordance with claim 14, wherein the computer-executable instructions further cause the processor to adjust the values of the parameters such that the predicted performance level has a quantifiable achievement level of less than 100 percent.

18. The computer-readable storage media in accordance with claim 14, wherein the computer-executable instructions further cause the processor to:

access actual performance data that includes recent performance data and older performance data for the at least one learner; and determine the predicted performance level for the training program for the at least one learner based on a weighted average of the actual performance data, the weighted average having a greater emphasis on the recent performance data than the older performance data.

19. The computer-readable storage media in accordance with claim 14, wherein the computer-executable instructions further cause the processor to display the parameter selection window on a first user interface, and to administer the second training program to the at least one learner on a second user interface.

20. The computer-readable storage media in accordance with claim 14, wherein the training program is a flight simulation, wherein the computer-executable instructions further cause the processor to determine the predicted performance level based on a selection of technological malfunction parameters including engine malfunctions, control malfunctions, and indicator malfunctions, and based on a selection of weather conditions.

* * * * *